United States Patent [19]

Schlesch

[11] Patent Number: 4,842,460

[45] Date of Patent: Jun. 27, 1989

[54] LOAD HOLDING DEVICE

[75] Inventor: Ronald D. Schlesch, Stuart, Fla.

[73] Assignee: Armstrong International, Inc., Three Rivers, Mich.

[21] Appl. No.: 98,482

[22] Filed: Sep. 18, 1987

[51] Int. Cl.$^4$ .................. B61D 45/00; B63D 25/24
[52] U.S. Cl. .................................. 410/121; 188/32
[58] Field of Search .............. 410/7, 19, 30, 47, 49, 410/77, 94, 121, 129; 188/32; 248/206.5, 309.4; 428/100; 211/42, 43

[56] References Cited

U.S. PATENT DOCUMENTS

| 999,828 | 8/1911 | McNaughton | 410/94 |
|---|---|---|---|
| 2,461,767 | 2/1949 | Peyton | 410/121 |
| 2,812,728 | 11/1957 | Reheis | 410/121 |
| 3,265,159 | 8/1966 | Worden | 188/32 |
| 3,557,909 | 1/1971 | Neumann | 188/32 |
| 3,601,917 | 8/1971 | Shankman | 428/100 |
| 3,604,564 | 9/1971 | Weyll, Jr. | 211/42 X |
| 4,144,951 | 3/1979 | Rea | 188/32 |
| 4,338,053 | 7/1982 | Abel | 410/94 |
| 4,429,348 | 1/1984 | Dean | 428/100 |
| 4,616,796 | 10/1986 | Inoue | 248/309.4 |

FOREIGN PATENT DOCUMENTS 2416132 10/1972 France .................. 410/30

OTHER PUBLICATIONS

Cox, IBM Technical Disclosure Bulletin, Locking Containers on Flat Railcars or Trucks, vol. 17, No. 2, 7-1974.

Primary Examiner—Carlton R. Croyle
Assistant Examiner—Leonard P. Walnoha
Attorney, Agent, or Firm—Flynn, Thiel, Boutell & Tanis

[57] ABSTRACT

A releasable cargo anti-skid block for gripping the cargo bed of a vehicle comprises a rigid body having a cargo engageable upstanding side and a cargo bed engageable bottom. The bottom and upstanding side join at a corner edge. Gripping apparatus on the bottom of the body extends lengthwise along the bottom. The gripping apparatus are fixed with respect to the body for forcibly but releasably gripping the surface of the cargo bed of the vehicle.

12 Claims, 4 Drawing Sheets

LOAD HOLDING DEVICE

FIELD OF THE INVENTION

This invention relates to a load holding device, and more particularly to a cargo anti-skid block for the cargo bed of a vehicle.

BACKGROUND OF THE INVENTION

Vehicles such as pickup trucks and vans have been popular, and continue to be popular, in that they generally have larger cargo areas than conventional family sedans of similar size and hence can haul larger items than a conventional sedan.

However, a problem arises when only a portion of the vehicle cargo area is being used to transport one or more small objects. Conventional pick up trucks, station wagons, hatchbacks and vans are conventionally not provided with cargo tie points or barricades by their manufacturers. Further, the floors of these vehicles are typically finished in such a way that smaller cargo items can skid or slide across the floor or tip over while the vehicle is in motion, while particularly during vehicle acceleration or deceleration or cornering.

Common load items which are particularly troublesome include bags of groceries. These often contain items that are breakable and can spill contents that are difficult to clean up, or are hard and have corners that might damage paint or plastic trim on cargo area surfaces. Moreover, vehicle owners frequently wish to maintain the interior of the cargo area in a like-new condition as long as possible, particularly when the cargo area is visible to vehicle passengers, and hence owners are reluctant to deface the walls and floor of the cargo area by permanently installing hooks, eyes, or other permanent attachment points to which cargo items could be secured by straps, line, or elastic shock cord.

Accordingly, the objects of this invention include provision of a load holding device providing a solution to the aforementioned problems, which will not mar the interior surface of the cargo area, which requires no permanent installation, which is readily movable from place to place in the cargo area to fit the needs of different sized or located loads, which is both versatile and simple to use, which can readily be attached to or detached to the load floor of the cargo area (be it of painted steel as in a conventional pick up truck, or a loop pile carpet as often as found in the cargo area of stations wagons, hatchback and vans), which is producible in quantity at relatively low cost, which may be used individually or in sets to facilitate lateral securement of cargo items, which may cooperate with existing sidewalls of the cargo area to secure load items in place, and which may additionally be used as a vehicle wheel chock.

Other objects and purposes of the invention will be apparent to persons acquainted with devices of this general type upon reading the following specification and inspecting the accompanying drawings.

The objects and purposes of this invention are met by providing a releasable cargo anti-skid block for gripping the cargo bed of a vehicle, comprising a rigid body having a cargo engageable upstanding side and a cargo bed engageable bottom, the bottom and upstanding side joining at a corner edge, and gripping means on the bottom of the body, the gripping means being adjacent to and extending lengthwise along the corner edge, the gripping means being fixed with respect to the body for forcibly but releasably gripping the surface of the cargo bed of the vehicle.

DETAILED DESCRIPTION

Figures 1, 2, 3, 4, 19:
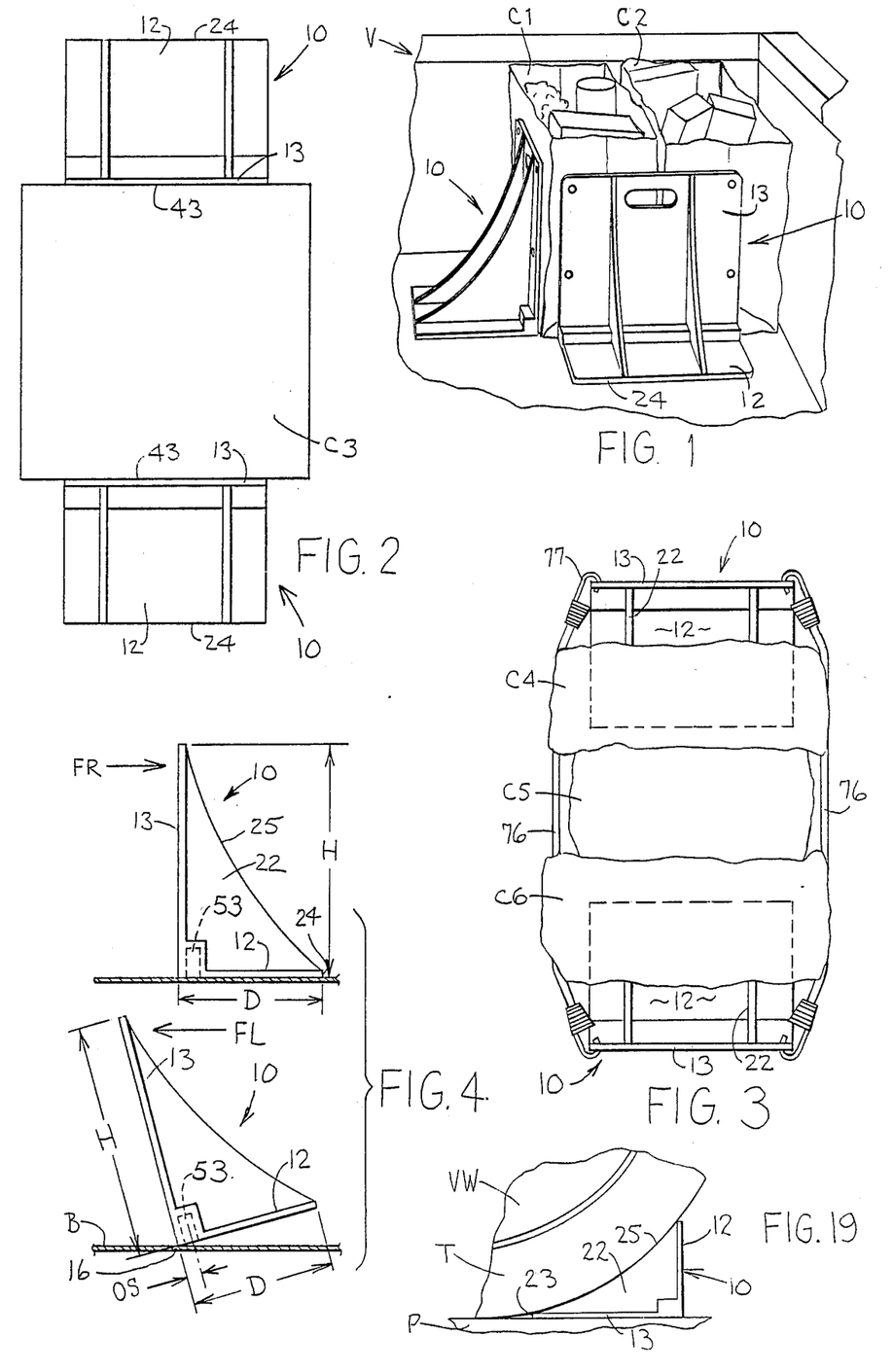
FIG. 1 is a fragmentary pictorial view of one corner of the cargo area of a vehicle, for example a pickup truck, with two devices according to the present invention located to prevent tipping over and lateral skidding of two cargo items, for example filled grocery bags.
FIG. 2 is a top view of a pair of devices embodying the invention and holding between the front sides thereof a box-like cargo item.
FIG. 3 is a top view showing a pair of devices according to the invention spaced in back-to-back relation with plural cargo items located therebetween and with elastic tension cords (shock cords) forcing the backs of the devices toward each other to sandwich the cargo items therebetween.
FIG. 4 is a side view of two devices according to FIGS. 1–3, showing their reaction to lateral forces applied respectively to the front and to the back of the device.
FIG. 19 is a fragmentary side view showing a device according to FIGS. 1–18 used as a wheel chock.

FIG. 1 shows a pair of identical releasable cargo anti-skid blocks 10 embodying the invention. Each cargo block 10 is adapted to grip the cargo bed B of a vehicle V as hereafter discussed.

Each block 10 comprises a rigid body 11, preferably of a suitable molded plastics material. Suitable plastics materials include filled polyethylene and nylon and other plastics of suitable characteristics. The body 11 is generally of L-shape, comprising a cargo bed engageable bottom 12 (FIG. 5) and a cargo engageable upstanding side 13 upstanding substantially at right angles to the bottom 12 and located at one length edge of the bottom. The bottom 12 and upstanding side 13 are preferably rectangular and join at a corner edge 16. The corner edge 16 is the bottom edge of side 13 and a long edge of the bottom 12. The body 11 includes a buttress 18 of generally rectangular cross section filling the apex of the angle between the bottom 12 and side 13 and running the width of the bottom 12 and side 13. The buttress 18 has a rounded corner 21 (FIG. 10) diagonally opposed to the corner edge 16. The buttress 18 strengthens the connection of the bottom 12 and side 13 and houses a recess 52 hereafter discussed.

A pair of laterally spaced, side-by-side, parallel, plate-like webs 22 span the angle between the bottom 12 and side 13 to further rigidify the block 10. The webs each taper toward the top 23 of the side 13 and toward the longitudinal free edge 24 of the bottom 12.

In the preferred embodiment shown, the webs have a valuable further purpose. More particularly, the webs are positioned and shaped to enable the block 10 to be used alternatively as a wheel chuck as seen in FIG. 19. To this end, the webs 22 are disposed symmetrically of the width W (FIG. 6) of the block 10 and are separated by a spacing S somewhat less than the width of a conventional automotive vehicle tire tread as may be found on typical pick up trucks and vans. The webs 22 have concavely curved free edges 25. The height H of the side 13 (FIG. 4) is greater than the depth D of the bottom 12 and the webs 22 run the full height H and depth D of the side 13 and bottom 12. Accordingly, when the block 10 is rotated 90° counterclockwise from its upper FIG. 4 position to its FIG. 17 position, so that the side 13 lies flat on the pavement P and the bottom 12 is upstanding therefrom, the tread TT of a conventional tire T supporting the vehicle wheel VW can rest against the concave free edge 25 of the webs 22. The weight of the tire T rests upon the side 13 adjacent the top 23 so as to press the body 10 firmly against the pavement P, to help prevent the block 10 from skidding along the pavement P toward the right in FIG. 17. Since the block 10 is thus immobilized with respect to the pavement P, the upstanding bottom 12 and the webs 22 positively block clockwise rolling of the tire T and hence advancement of the vehicle wheel VW rightwardly in FIG. 17.

To minimize weight and reduce material use and costs, without sacrificing strength, the side 13 is provided with horizontal and vertical strengthening ribs 25 (FIG. 6) on the rearward face 26 thereof, which permits the major area of the planar portion 27 of the side 13 to be reduced in thickness. Similarly, the bottom 12 is provided with strengthening ribs 31 along the top face 32 thereof which enable the planar portion 33 of the bottom 12 to be made of thinner material as well.

Figures 5, 6:
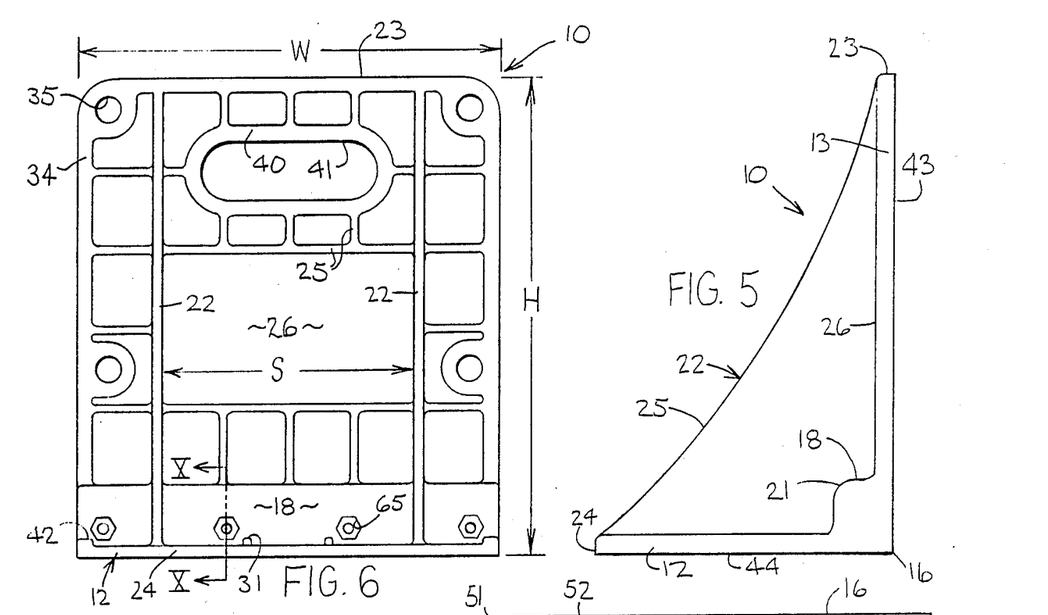
FIG. 5 is an enlarged side view of the FIG. 1 device.
FIG. 6 is an enlarged back view of the FIG. 1 device.

The ribs 25 include perimeter ribs 34 extending along the left and right side edges and top edge of the side 13. These perimeter ribs 34 are enlarged in width (as seen in FIG. 6) to surround through holes 35 arranged near the opposite side edges of the side 13. In the embodiment shown, the upper two holes 35 are provided at the upper corners of the side 13. The ribs 25 further include a rib 40 which surrounds and strengthens the perimeter of a hand opening 41 provided to facilitate gripping of the upper portion of the side 13 by the hand of the user.

The ribs 31 on the bottom 12 include perimeter ribs 42 extending forwardly along the side edges of the bottom 12 from the buttress 18.

The forward face 43 of the side 13 and the bottom face 44 of the bottom 12 are preferably smooth to facilitate engagement with cargo and the cargo bed of the vehicle.

Gripping means 51 (FIGS. 8 and 10) face downward from the bottom of the body. The gripping means 51 are adjacent to and extend lengthwise along the corner edge. The gripping means are fixed with respect to the body for forcibly but releasably gripping the surface of the cargo bed of the vehicle. In the embodiment shown in FIGS. 5–11, the gripping means 51 includes an elongate recess 52 in the bottom of the body. A magnet assembly 53 is received in the recess 52 and thus extends along and adjacent to the corner edge 16. Fastening means 54 (FIG. 10) locate the magnet assembly 53 in the recess to secure the bottom of the body 10 releasably to a cargo bed B of magnetizable material, such as the steel bed of a conventional pickup truck.

Figures 7, 8, 10:
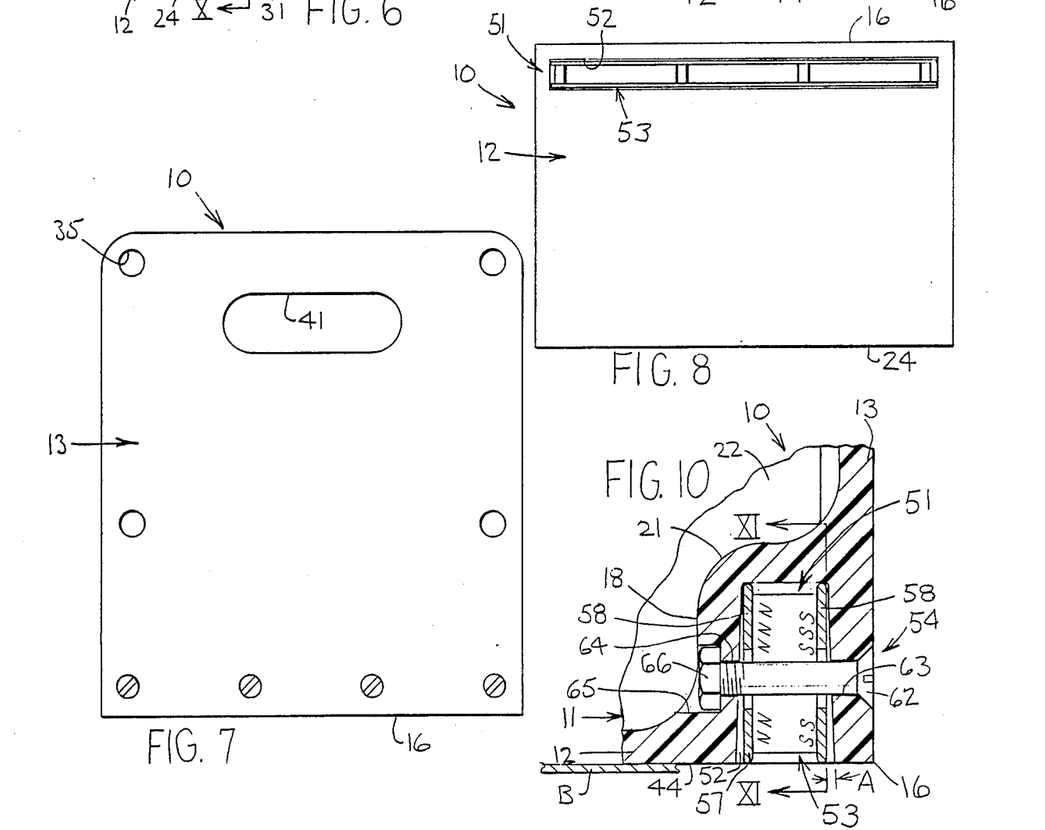
FIG. 7 is an enlarged front view of the FIG. 1 device.
FIG. 8 is an enlarged bottom view of the FIG. 1 device.
FIG. 10 is an enlarged, fragmentary sectional view substantially taken on the line X—X of FIG. 6.
Figure 9:
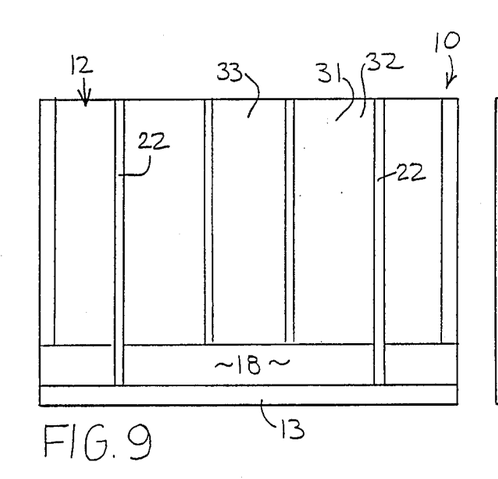
FIG. 9 is an enlarged top view of the FIG. 1 device.
Figure 11:
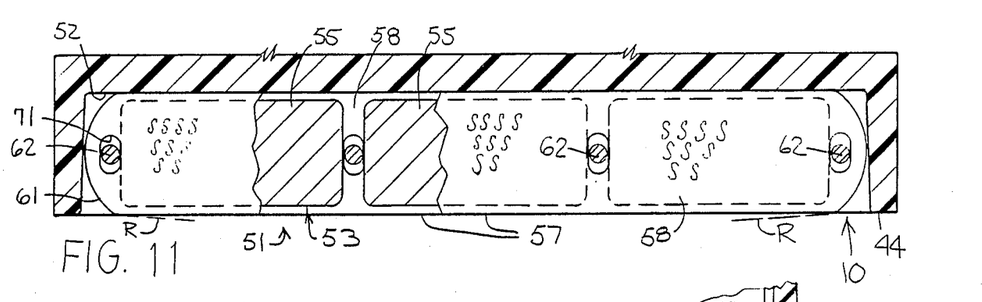
FIG. 11 is an enlarged fragmentary, partially broken, sectional view substantially taken on the line XI—XI of FIG. 10.

In the preferred embodiment shown, the magnetic assembly 53 comprises a plurality, here three, of bar-like magnets 55 spaced end-to-end and sandwiched between two elongate plate-like pole pieces 58 (FIGS. 10 and 11). The north poles NNN ... of all the magnets 55 face one pole piece 58 and all the south poles SSS ... face the other pole piece 58. Note that the magnetic poles are in the two largest area faces of each magnet 55. The pole pieces are of magnetizable plate material.

The planes of the pole pieces 58 are substantially perpendicular to the plane of the bottom 12 of the body 10. Each pole piece 58 has a bottom length edge 57 lying approximately flush with the bottom face 44 of the body 10 for engaging and completing a magnetic circuit with the magnetizable material of the opposed cargo bed B for thereby magnetically securing the body 10 releasably to the cargo bed B. The ends of the pole pieces are rounded at 61 in FIG. 11.

The pole pieces are of greater vertical extent than the magnets 55 so as to extend downwardly below the magnets as seen in FIGS. 10 and 11. Accordingly, the magnets themselves do not come into contact with the steel cargo bed and indeed are somewhat recessed therefrom so as to avoid damaging contact therewith. This is particularly of interest when ceramic magnets are used. Ceramic magnets are advantageously low in cost and high in magnetic field strength per unit volume of magnet, but are somewhat brittle and could risk being broken by a sharp impact with a hard object as might occur due to careless handling of the block 10.

The cargo beds of pickup trucks tend to be relatively uneven, particularly after a period of use during which tools and other heavy objects may have been dropped onto the bed and cause it to become dented. In recognition of this unevenness, and to maximize adherence of the block 10 to the cargo bed despite this unevenness, the magnet assembly 53 is permitted several degrees of freedom of limited movement within the recess and hence with respect to the block 10. To this end, the fastening means 54 permits limited vertical movement and, when looking toward the front face 43 of the side 13, limited pitch and roll angular movements, of the magnet assembly 53 with respect to the body 11.

More particularly, the front and rear faces of the recess 52 (right and left respectively as seen in FIG. 10) each taper divergently downward away from the adjacent pole piece at an angle indicated at A in FIG. 10. This permits the magnet assembly 53 to move angularly in a pitching manner as seen from the front face 43 of the block 10, namely by swinging through an angle 2A.

Further, the fastening means 54 comprises a plurality (here four) of machine screws 62. The machine screws 62 extend through countersunk holes 63 in the side 13, through the recess 52 and then through holes 64 in the rear face of the buttress 18. The holes 64 in the rear face of the buttress are hexagonally recessed at 65 (FIGS. 6 and 10) to receive and prevent rotation of corresponding nuts 66 threadedly engaging the corresponding machine screws 62. The end portion of each screw 62 passes snugly through the holes 63 and 64 in the body 11 but the midportion of each screw 62 passes through vertically elongate oblong holes 71 in the pole pieces. The oblong holes 71 thus permit the pole pieces to move vertically, and also angularly in roll, when viewed from the front face 43. Accordingly, the magnet assembly can move vertically downward to protrude partly from the bottom of the recess 52, and also can tilt clockwise or counterclockwise as indicated at R in FIG. 11 the roll angle R being exaggerated for clarity in illustration.

In these ways the magnet assembly can thus accommodate to a dented or otherwise distorted bed so as to maintain maximum contact between the bottom edges of the pole pieces and the steel bed of the vehicle. The rounded ends 61 of the pole pieces facilitate roll movement of the magnet assembly with respect to the recess 52 in the body 11 and prevent gauging of the cargo bed B.

In the embodiment shown, the angle A is about 2° and the oblong holes 71 permit the magnet assembly to float from a position flush with the bottom face 44 (as shown in FIG. 11) to a position about 0.01 inch below the bottom surface 44.

In the embodiment shown, the pole pieces 58 are of low carbon steel, which are electroless nickel plated to prevent corrosion and to facilitate adherence of the magnets 55 to the pole pieces.

Applicant has found that it is better to use several small magnets than a single large magnet. The small magnets allow the oblong holes 71 to be spaced along the length of the magnetic assembly and holes, particularly the oblong holes 71, would be difficult to drill through ceramic magnets. Further, it is desirable to round the ends of the magnetic assembly as indicated at 61 and this too would be difficult to achieve at the end of a ceramic bar magnet. Furthermore, the pole pieces, as above discussed, by vertically overlapping the ceramic magnets 55, help to protect the brittle surface of the latter from chipping or shattering if the block 10 is accidentally dropped onto sharp objects in the pickup truck bed area or drop it on a concrete roadway. Indeed, even in installation of the block 10 upon a smooth bed B, as the magnet assembly gets close to the steel truck bed, the magnetic attractive force grows rapidly in square law relation and tends to suddenly accelerate the body 10 and magnet assembly downwardly toward the truck bed in kind of a snap action. The resulting shock of collision might itself damage an exposed ceramic magnet, which problem is avoided by the protective pole pieces 58 protruding downwardly somewhat beyond the ceramic magnets 55.

Furthermore, the rounding of the lower pole piece longitudinal edges at 57 slightly reduces the actual contact area of the pole piece against the metal truck bed at a given point along the length of the magnet assembly and so concentrates magnetic flux into a small area and increases holding power. Further, the rounded edge surfaces 57 of the pole pieces are more easily (than a squared off edge) capable of making close contact with the bed surface despite small scale imperfections in the surface of the bed.

In the embodiment shown, 14 gauge pole piece material was used because tested larger and smaller gauges seem to give less magnetic attractive force. It is believed that this is due to the fact that the magnet is to abut the bed of a pickup truck which is typically of 16 gauge steel rather than a much thicker or thinner material. Thus there appears to be a match between pole piece thickness and bed thickness in terms of optimizing magnetic attractive force therebetween.

The screws 62 and nuts 66 are of a nonmagnetic material which is also preferably noncorrosive, for example a suitable stainless steel or brass, although use of a plastic material for the screw and nut is contemplated. Any screw material has to be able to resist a very strong pull tending to cause shearing stress on the screw, as the block 10 is engaged with and disengaged with the steel bed of the pickup truck. The fastening structure at 62, 66 need not be a screw and nut but rather may be some other type of fastener. In any event, the screws and nuts are not tightened enough to distort the front face 43 of the block out of a planar condition.

OPERATION

Referring to the upper half of FIG. 4, with the bottom 12 of the block 10 resting on the bed B of the vehicle, and magnetically gripping same as hereinabove discussed, the block 10 resists forces against its forward face, which forces would tend to tilt same in a clockwise direction or slide same rightwardly out of its FIG. 4 position, due to the magnet assembly. Also due to the magnet assembly, the block 10 cannot readily pivot clockwise over its rightward edge because to do so would require almost a straight lift of the magnet of the magnetizable material surface of the bed B. The effort required to effect such a clockwise rotation is typically almost as great as in a direct upward lift of the block 10 off the surface of the bed B. This is because of the relatively long lever arm (distance D). The far easier way to remove the block 10 from the bed B is to rock it in a clockwise direction as in the lower half of FIG. 4, due to imposition of a leftward force on the top of the block 10.

The distance between the corner edge 16 and the magnet assembly in FIG. 4 is small compared to distance D. Accordingly, it is easy to tilt the block 10 in such clockwise direction to free it from the cargo bed B. The offset distance OS by which the center of the magnet assembly 53 is offset rightwardly from the corner edge 16 is much smaller than the depth D of bottom 12 and an even greater amount less than the height H of the side 13. Accordingly, the rightward force FR in the upper half of FIG. 4 needed to clockwise tilt the block 10 with respect to the bed B will be much higher than the leftward force FL required to counterclockwise tilt the block 10 with respect to the bed B.

In one embodiment, the height H was 8 inches, the depth B was 5 inches, and the offset OS was 0.5 inch. Accordingly, the force FR needed to clockwise rotate the block 10 out of its position shown in the upper half of FIG. 4 would be almost as much as the force required to lift the magnet assembly 53 vertically from the bed B. On the other hand, the force FL required to counterclockwise rotate the block 10 in the lower half of FIG. 4 would be substantially less, in the example above discussed in approximately the ratio of 0.5 inch (OS) to 8 inches (H) or about 1/16 of the force required to lift the magnet assembly 53 straight up from the bed B, the forces FR and FL in each instance acting on the side 13 near the top thereof.

In one test, a block 10 of the immediately above discussed size placed on the flat 16 gauge steel sheet required a force of about 45 to 47 pounds to lift the block 10 straight up off the bed B, and the force required in initiate sliding was about 40 pounds.

Figure 13:
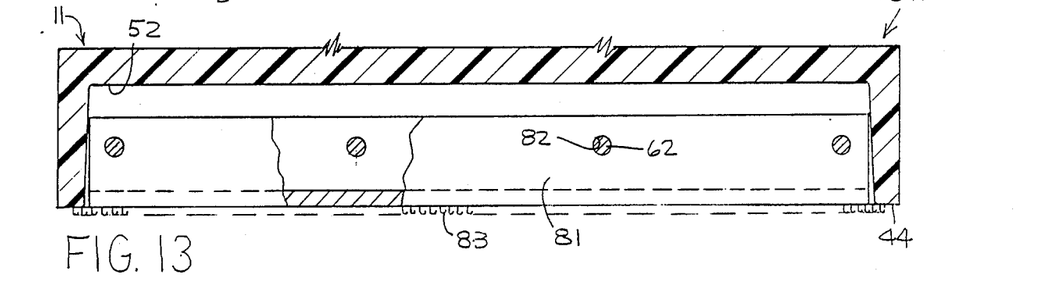
FIG. 13 is a view similar to FIG. 11 but showing the FIG. 12 modification.

From the foregoing, it will be seen that the blocks 10 can be used in several ways to prevent skidding or tipping of cargo items on the bed B. In FIG. 1, blocks 10 are placed to press cargo items C1 and C2 against sides of the vehicle cargo area and thereby hold same both upright and in one place on the cargo bed B. In FIG. 2 a box-like cargo item C3 is held in place by lateral compression between two cargo blocks 10 whose front faces 43 are pressed thereagainst. In both FIGS. 1 and 2, any tendency of the cargo to displace the blocks 10 would correspond to the force FR in FIG. 4, which as above stated must be very high to either slide the block 10 away therefrom or tilt it (clockwise in FIG. 4) away therefrom by rocking up around the toe, or free edge, 24 of the block. In FIG. 13, the blocks 10 are used in an opposite orientation, namely with their webbed back sides facing each other and the cargo items C4, C5 and C6 sandwiched therebetween. Shock cords 76 have their hooked ends 77 inserted in ones of the holes 35 in the sides 13 of the proposed blocks 10, the shock cord 76 bounding the opposite sides of the cargo items C4-C6 to prevent their moving sideways, while the upstanding sides 13 and webs 22 of the blocks 10 prevent movement of the cargo items C4-C6 in the other lateral direction (vertically along the page in the FIG. 3 illustration). Again, the lateral force is either on the sides 13, here by the shock cords 76, corresponds to the force FR in FIG. 4, namely a force which is strongly resisted both as to tilting and sliding by the block 10 and its magnet assembly 56.

MODIFICATION

Figure 12:
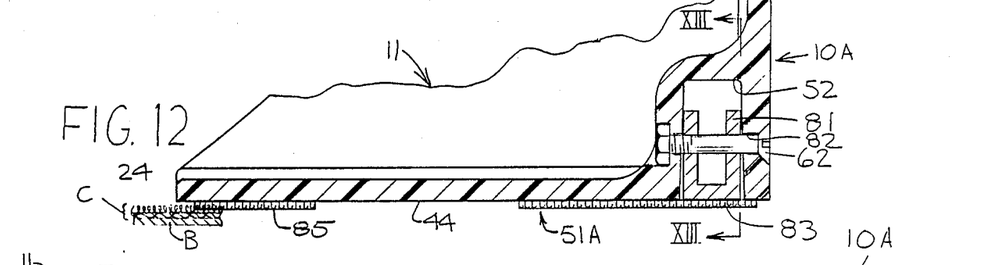
FIG. 12 is a fragmentary cross sectional view, generally corresponding to FIG. 10, but showing a modification.
Figure 14:
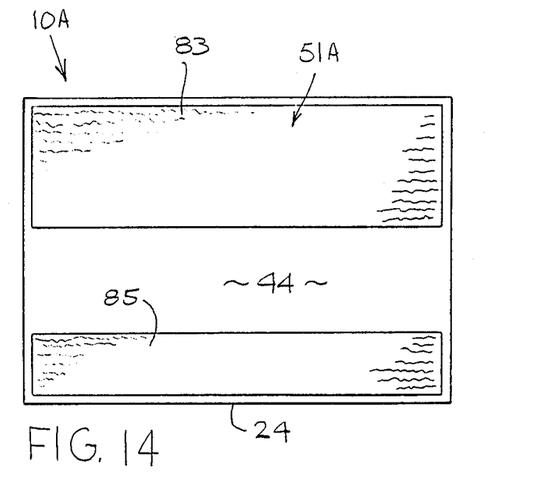
FIG. 14 is a view similar to FIG. 8 but showing the FIG. 12 modification.
Figure 15:
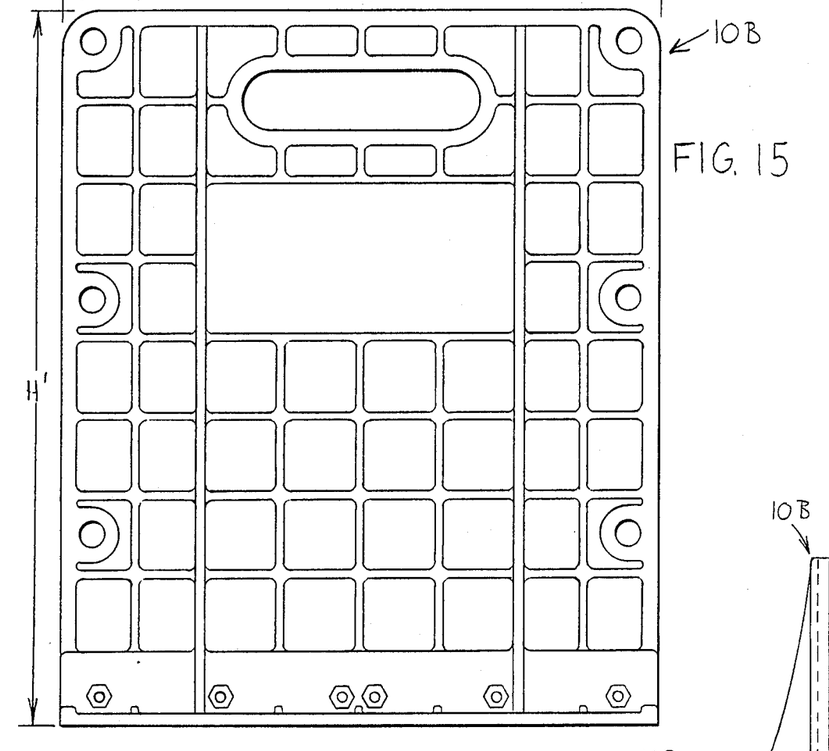
FIG. 15 is view similar to FIG. 6 and showing further modification involving a block of larger size, for holding larger items of cargo.

Turning to the modification shown in FIGS. 12–14, structural elements similar to those in above described FIGS. 1–11 will be designated by the same reference numerals with the suffix A added.

The FIG. 12–14 modification is similar to the FIG. 1–11 embodiment except as hereafter described. To adapt the same body 11 to use in the FIG. 12–14 embodiment, the magnet assembly 53 out of FIG. 1–11 is removed and in its place a nonmagnetic insert 81, here of suitable plastics material and preferably of U cross-section, channel shape, is instead inserted with the recess 52 in the bottom of the body 11. Such insert 81 is provided with circular holes 82 which snugly receive the shanks of the above described screws 62 (or other convenient fastening means) therethrough to fixedly locate the insert 81 within the recess 52. It is not necessary for the insert 81 to extend to the full height of the recess 52. However, the bottom 83 of the insert is located so as to be flush with the bottom 44 of the body 11. Further, the lateral dimensions of the insert 81 preferably correspond closely to those of the recess 52 where it opens through the bottom face 44 of the body 11, so that the entire bottom face 44 is smooth and continuous and substantially unbroken even at the recess 52.

In the FIG. 12–14 embodiment, the gripping means 51A takes the form of a strip of multiple hook material. An example of such material is available under the trademark VELCRO from a wide variety of commercial sources including, at least in smaller widths, retail sewing centers and department stores.

In the embodiment shown, the first strip 83 is adhesively fixed to the bottom face 44 and to the bottom of the insert 81. A suitable adhesive is manufactured by 3M (Minnesota Mining and Manufacturing) of Minneapolis, Minn. under model number 4693. The edge of the VELCRO strip 83 is inset about ⅛ inch inward from the adjacent edges of the bottom face 44 to prevent VELCRO edge damage and pull away.

To insure that the block 10A will sit level and to provide extra resistance to skidding along the bed B, a narrower secondary hook type strip 85, which may also be of VELCRO, is similarly adhered to the bottom face 44 adjacent the front edge 24 thereof.

The block 10A operates substantially in the manner above described with respect to the embodiment of FIGS. 1–11 except that it is intended to be used upon a cargo bed B covered with loop type carpeting C, the hooks in the strips 83 and 85 engaging the loops in conventional pile carpeting in a conventional hook-in-eye manner to resist tipping of the block 10A particularly in a counterclockwise direction of FIG. 12, much as was discussed above with respect to FIG. 4. The narrower strip 85 near the front edge 24 of the body 11 was purposely made narrower than the primary strip 83 so as to produce only minimal resistance to intentional pivoted detachment of the body 11 from the carpeted bed B, much as described above with respect to the bottom portion of FIG. 4 and the force FL. The block 10A can also be used with bed surfaces provided with eyelet type strips, for example of VELCRO material, as well as with the above-mentioned loop type pile carpeting. When used with carpeting, the block 10A limits movement of cargo items (as above discussed with respect to FIGS. 1–3) with respect to such carpeting. It is therefore desirable that the carpeting be firmly secured to the supporting portion (e.g. steel or other deck) of the cargo bed B.

FURTHER MODIFICATION

Figures 16, 17, 18:
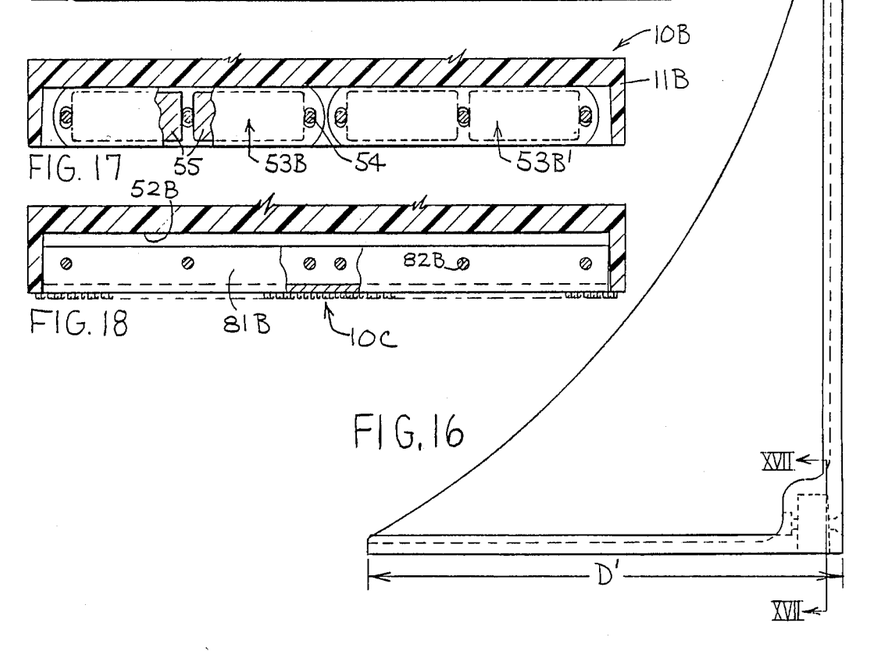
FIG. 16 is a view similar to FIG. 5 but showing the FIG. 15 modification.
FIG. 17 is a view similar to FIG. 11 but showing the FIG. 15 modification.
FIG. 18 is a view similar to FIG. 13 but showing the FIG. 15 modification.

FIGS. 15–18 show a further modification in which the block 10B is of enlarged size, for example with a height H' of 12 inches, a width W' of 10 inches and a depth D' of 8 inches. Whereas the FIG. 1–11 embodiment is of width W corresponding to a span of approximately two ribs of the usual ribbed pickup truck bed B, the block 10B has a width W' corresponding to approximately three such ribs. To assure maximum contact of the magnetic assemblies with the bed of the vehicle, despite this additional width and coverage of more ribs of the pickup truck bed in recognition of the fact that such ribs may become distorted in hard use of the vehicle, the modified block 10B is provided with more than one magnet assembly. The magnet assemblies 53B and 53B' are shown in FIG. 17. These are similar to the magnet assemblies 53 of the FIG. 1–11 embodiment except that each is shorter and includes only a pair of magnets 55 and each is located by three, rather than four fastening means 55. In this way, the two magnet assemblies 53B and 53B' can adjust their positions with respect to the body 11B independently of each other, i.e. can adjust vertically, in pitch, and in roll, with respect to each other as well as with respect to the body 11B.

Although multiple magnet assemblies are employed as above discussed, only a single insert 81B is required to convert the block 10B from magnetic to hook type material gripping means, such insert 81B fitting in the corresponding body recess 52B in the manner above described with respect to the FIG 12-14 embodiment although being longer and having more holes 82B therein than above discussed with respect to the FIG. 11-14 embodiment.

Operation of the FIG. 15-17 and FIG. 18 embodiments are otherwise similar to those earlier described.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A releasable cargo anti-skid block for gripping the cargo bed of a vehicle, comprising:
   a rigid body having a cargo engageable upstanding side and a cargo bed engageable bottom, the bottom and upstanding side joining at a corner edge;
   gripping means on said bottom of said body, said gripping means being fixed with respect to said body for forcibly but releasably gripping the surface of the cargo bed of the vehicle;
   said gripping means including an elongate recess in said bottom of said body adjacent to and extending along said bottom, a magnet assembly received in said recess and thus extending along and adjacent said corner edge, and fastening means for locating said magnet assembly in said recess to secure the bottom of said body adjacent said corner edge releasably to a cargo bed of magnetizable material;
   said recess divergently tapering towards its open bottom and away from the side of the magnet assembly therein, said magnet assembly being loosely received in said recess, said fastening means comprising plural elongate members extending through holes in said body and magnet assembly in a direction generally parallel to said bottom, said elongate fastening members being loosely received in the holes and at least one of said body and magnet assembly for permitting limited movement of said magnet assembly up and down parallel to said side and in pitching and rolling angular directions as seen from the free edge of said bottom remote from said corner edge, to enable said magnet assembly to most efficiently grip a cargo bed which may be dented or have other surface deformations while said bottom is supported on said cargo bed.

2. The apparatus of claim 1 including a gripping means alternative to said magnet assembly, said alternative gripping means comprising a nonmagnetic insert snugly receivable in said recess in place of said magnet assembly, said alternative gripping means further including a first strip of multiple hook material fixed to the bottom of said body along said corner edge and covering said insert and engageable with multiple loop material on the cargo bed to resist skidding along and therefore movement of said block with respect to said cargo bed.

3. The apparatus of claim 2 in which said insert has a flat bottom face flush with the bottom of said body, said insert having holes therethrough registered with holes in said body for receiving said elongate fastening members to fixedly secure said insert in said body in place of said magnet assembly.

4. A releasable cargo anti-skid block for gripping the cargo bed of a vehicle, comprising:
   a rigid body having a cargo engageable upstanding side and a cargo bed engageable bottom, the bottom and upstanding side joining at a corner edge;
   gripping means on said bottom of said body, said gripping means being fixed with respect to said body for forcibly but releasably gripping the surface of the cargo bed of the vehicle;
   said side and bottom defining an L-shape, said body being of rigid, molded material, a pair of parallel webs angling from the upper face of said bottom to the adjacent face of said side, the space between said webs being less than the width of the tread of a conventional vehicle tire so that said block is alternatively usable as a wheel chock for the vehicle with the side of said block laid on the ground and the bottom of said block upstanding from the ground, said upper face of said bottom and adjacent face of said side bearing strengthening ribs of generally uniform thickness approximately doubling the thickness of the side and bottom at said ribs, said ribs including a perimeter rib extending along the side edges of said bottom and side and having a central bight along the top edge of the side, said perimeter rib having portions on said side and widened away from the edges of said side and located along the side edges and adjacent the top corners of said side, said side having plural holes therethrough for securing ties to keep a load fixed with respect to the cargo bed, said holes being through said widened portions of said perimeter rib and being spaced from the edges of said side by approximately the thickness of said perimeter rib, intermediate ribs crisscrossing said adjacent face of said side and extending from the perimeter rib portions along the side edges and top edge of said side in a lattice-like manner, ones of said intermediate ribs intersecting said webs, a substantially box-like hollow reinforcement protruding into the angular space between said faces of said bottom and side, said box-like reinforcement intersecting an apex of said webs, said apex being opposite the free, tire engaging edges of said webs.

5. A releasable cargo anti-skid block for gripping the cargo bed of a vehicle, comprising:
   a rigid body having a cargo engageable upstanding leg panel and a cargo bed engageable foot panel, the foot panel and upstanding leg panel joining at a corner edge and subtending approximately a right angle therebetween, said upstanding leg having a front surface overlooking said foot and a back surface means for abutting cargo supported upon said cargo bed, said foot panel having a bottom surface including a heel area adjacent said corner edge, said foot panel having a toe edge remote from said corner edge;
   gripping means fixed at said heel area for preventing (1) lifting of said heel area and pivoting of said body about said toe edge with respect to said cargo bed and (2) sliding of said body along the surface of the cargo bed in response to pushing of said cargo on the back surface means of said upstanding leg panel in which said gripping means comprises a generally rectangular cross section buttress extending substantially the width of said body and reinforcing the joinder of said leg and foot panels, said buttress protruding into said approximately right angle between the front of said leg panel and the top of said foot panel, said buttress being hollow and thereby defining an elongate recess opening downward from the heel area of said bottom panel; said gripping means further including elongate first and second gripping units alternatively received in said recess, said first unit comprising a magnet assembly received in said recess and thus extending along and adjacent said corner edge, said second unit comprising an insert similarly received in said recess and extending along and adjacent said heel area, said insert having an outer face to which is affixed a nonmagnetic gripping surface, and fastening means for alternately fixing said first and second units in said recess to secure the bottom of said body adjacent said corner edge releasably to a cargo bed.

6. A combined wheel chock and cargo anti-skid block for a vehicle, comprising:
a rigid L-shaped body comprising longer and shorter panel-like legs joined at substantially a right angle along a corner edge, said panel-like legs having respective interior faces opposed across said substantially right angle, said panel-like legs each having an exterior face facing a direction opposite said interior face thereof, said body having reinforcing means comprising (1) a generally rectangular cross section buttress extending along said corner edge and joining said interior faces of said panel-like legs, and (2) spaced substantially parallel webs disposed substantially at right angles to both said panel-like legs and rigidly edge fixed to the interior faces of said legs, said webs being spaced apart at less than the width of the tread of a conventional vehicle tire, said webs having free edges extending between the free ends of said legs for bearing against a vehicle tire in chock-like relation, said shorter leg having (1) means on its interior face cooperative with said webs for blocking rolling of a vehicle wheel and (2) means on its exterior face for nondestructively coacting with and thereby gripping the cargo bed of the vehicle while lying face down thereon and thereby for preventing lateral sliding of said body along said cargo bed, said gripping means being at least in part located on the portion of said shorter leg adjacent said corner edge and buttress, said exterior faces of said legs being free of pointed protrusions capable of digging into or otherwise marring the cargo bed of the vehicle, the exterior face of said longer leg having surface means (1) upstanding for nondestructively backing cargo items lying on the cargo bed of the vehicle and (2) alternately horizontally ground engageable for wedged interposition of the free end of said longer leg between the ground and the tire of the vehicle in wheel chock relation therewith.

7. The apparatus of claim 6 in which said gripping means comprises means forcibly attractive to the vehicle cargo bed while in contact therewith for resisting upward pivoting of said body about the free end of said shorter leg in response to pressing of cargo against the upstanding exterior face of said longer leg.

8. The apparatus of claim 6 in which said gripping means comprises a first step of multiple hook material fixed with respect to the bottom of said body and engageable with multiple loop material on the cargo bed to resist skidding along and therefore movement of said block with respect to said cargo bed.

9. The apparatus of claim 6 in which said gripping means comprises magnet means substantially flush with said bottom surface and magnetically attractive to cargo beds of iron and iron-containing alloys.

10. The apparatus of claim 5 in which said nonmagnetic gripping surface comprises a first strip of multiple hook material fixed to the bottom of said body and engageable with multiple loop material on the cargo bed to resist skidding along and therefore movement of said block with respect to said cargo bed.

11. The apparatus of claim 10 including a second hook material strip parallel to and spaced remote from the first mentioned strip and fixed with respect to the bottom of said body to assist in resisting skidding of said body along said cargo bed.

12. The apparatus of claim 6 in which said gripping means comprise a magnet assembly recessed in said head area, said magnetic assembly comprising at least one magnet disposed in end-to-end relation and sandwiched between elongate plate-like pole pieces, the north poles of said magnets facing one pole piece and the south poles of the magnets facing one other pole piece, the pole pieces being of magnetizable plate material, the planes of the pole pieces being substantially perpendicular to the bottom of said body, each pole piece having a length edge lying approximately flush with the bottom face of said body for engaging and completing a magnetic circuit through the magnetizable material of the opposed cargo bed for thereby magnetically securing the body releasably to the cargo bed.

* * * * *

UNITED STATES PATENT AND TRADEMARK OFFICE
CERTIFICATE OF CORRECTION

PATENT NO. : 4 842 460

DATED : June 27, 1989

INVENTOR(S) : Ronald D. SCHLESCH

It is certified that error appears in the above-identified patent and that said Letters Patent is hereby corrected as shown below:

Col. 12, line 25; change "fixed to the bottom" to ---fixed with respect to the bottom---.

Col. 12, line 31; change "fixed with respect to the" to ---fixed to the---.

Signed and Sealed this

Tenth Day of July, 1990

Attest:

HARRY F. MANBECK, JR.

*Attesting Officer*  *Commissioner of Patents and Trademarks*